United States Patent
Zhong et al.

(10) Patent No.: US 11,481,448 B2
(45) Date of Patent: Oct. 25, 2022

(54) SEMANTIC MATCHING AND RETRIEVAL OF STANDARDIZED ENTITIES

(71) Applicant: Microsoft Technology Licensing, LLC, Redmond, WA (US)

(72) Inventors: Peide Zhong, Milpitas, CA (US); Feishe Chen, Palo Alto, CA (US); Weizhi Meng, Sunnyvale, CA (US); Wei Kang, Los Altos, CA (US); Feng Guo, Los Gatos, CA (US); Fei Chen, Saratoga, CA (US); Jaewon Yang, Sunnyvale, CA (US); Qi He, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 16/836,546

(22) Filed: Mar. 31, 2020

(65) Prior Publication Data
US 2021/0303638 A1    Sep. 30, 2021

(51) Int. Cl.
| G06F 16/903 | (2019.01) |
| G06F 16/35 | (2019.01) |
| G06F 16/95 | (2019.01) |
| G06K 9/62 | (2022.01) |
| G06N 20/00 | (2019.01) |
| G06F 40/30 | (2020.01) |

(52) U.S. Cl.
CPC ........ *G06F 16/90344* (2019.01); *G06F 40/30* (2020.01); *G06K 9/623* (2013.01); *G06K 9/6219* (2013.01); *G06K 9/6257* (2013.01); *G06N 20/00* (2019.01)

(58) Field of Classification Search
None
See application file for complete search history.

(56) References Cited

U.S. PATENT DOCUMENTS

| 11,030,257 | B2 * | 6/2021 | Dahl | G06F 16/188 |
| 2012/0016864 | A1 * | 1/2012 | Goyal | G06F 16/316 |
| | | | | 707/711 |
| 2015/0331908 | A1 * | 11/2015 | Duffy | G06F 16/2455 |
| | | | | 707/765 |
| 2016/0042251 | A1 * | 2/2016 | Cordova-Diba | G06F 16/51 |
| 2016/0232157 | A1 * | 8/2016 | Mansour | G06F 16/3334 |
| 2017/0060844 | A1 * | 3/2017 | He | G06F 16/3331 |
| 2018/0150749 | A1 * | 5/2018 | Wu | G06F 16/90335 |
| 2019/0384863 | A1 * | 12/2019 | Sirin | G06F 16/9024 |

* cited by examiner

*Primary Examiner* — Son T Hoang
(74) *Attorney, Agent, or Firm* — NDWE, LLP.

(57) ABSTRACT

During operation, the system obtains a first embedding produced by an embedding model from an input string representing an entity and a hierarchy of clusters of embeddings generated by the embedding model from a set of standardized entities. Next, the system searches the hierarchy of clusters for a subset of the embeddings that are within a threshold proximity to the first embedding in a vector space. The system then calculates embedding match scores between the input string and a first subset of the standardized entities represented by the subset of the embeddings based on distances between the subset of the embeddings and the first embedding in the vector space. Finally, the system modifies, based on the embedding match scores, content outputted in response to the input string within a user interface of an online system.

20 Claims, 7 Drawing Sheets

SEMANTIC MATCHING AND RETRIEVAL OF STANDARDIZED ENTITIES

BACKGROUND

Field

The disclosed embodiments relate to processing user-generated input. More specifically, the disclosed embodiments relate to techniques for performing semantic matching and retrieval of standardized entities in response to user-generated input.

Related Art

Analytics and/or machine learning are commonly used to discover trends, patterns, relationships, and/or other attributes related to large sets of complex, interconnected, and/or multidimensional data. To glean such insights, large datasets of features are analyzed using regression models, artificial neural networks, support vector machines, decision trees, naïve Bayes classifiers, and/or other types of machine learning models. The discovered information can then be used to guide decisions and/or perform actions related to the data. For example, the output of a machine learning model is used to guide marketing decisions, assess risk, detect fraud, predict behavior, and/or customize or optimize use of an application or website.

However, training and/or execution of machine learning models with large numbers of features and/or large data sets typically require more memory, computational resources, and time than those of machine learning models with smaller numbers of features or data sets. The use of complex machine learning models presents additional challenges in online environments, where machine learning output is generated in a real-time or near-real-time basis (e.g., in response to recent user actions or newly received data). For example, an online system uses machine learning models to generate scores that are used to select and display products, services, goods, and/or other entities to users while the users interact with the online system. When a request for these scores is received, a service in the online system retrieves features as input to one or more machine learning models, applies the machine learning models to the features to generate the scores, and returns the scores in response to the request. The service is additionally required to respond to the request within the latency limit specified in a service level agreement (SLA) for the service. As a result, the service may have difficulty scaling and/or meeting the latency requirement as the number of requests and/or number of scores produced in response to each request increase.

Consequently, machine learning and/or analytics may be facilitated by mechanisms for improving accuracy, resource consumption, latency, and/or scalability associated with large-scale and/or online scoring by machine learning models.

BRIEF DESCRIPTION OF THE FIGURES

In the figures, like reference numerals refer to the same figure elements.

DETAILED DESCRIPTION

Figure 1:
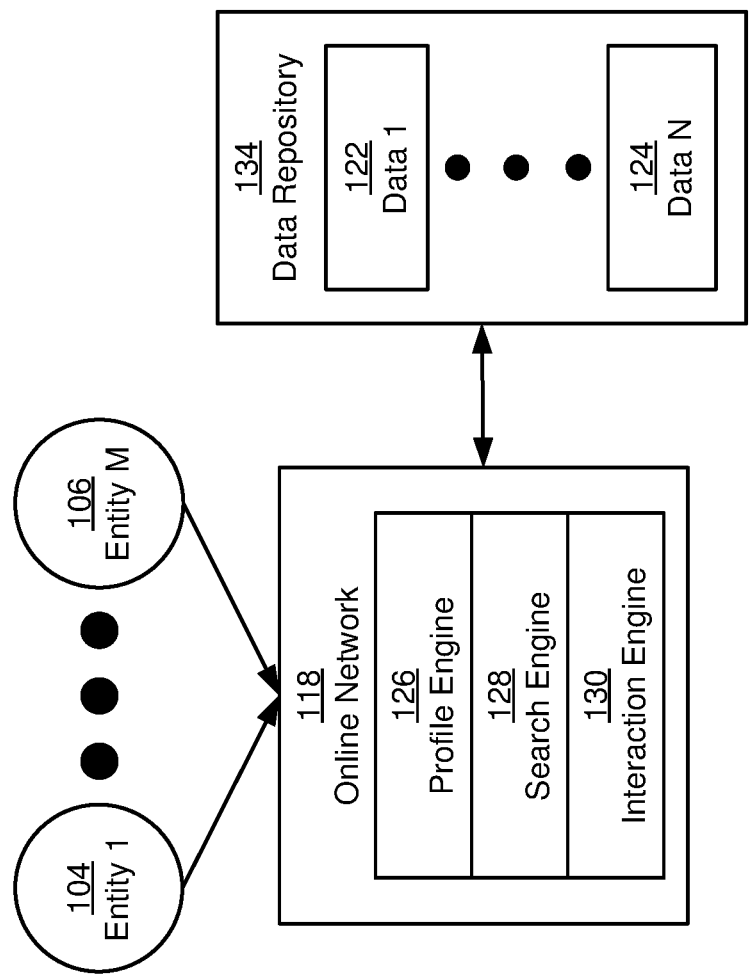
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for matching input strings to standardized entities. Each input string includes a user-generated text-based representation of an entity such as a company, industry, location, skill, title, seniority, and/or group. This user-generated representation may differ from a standardized version of the entity, which includes a string that acts as a canonical or consistent representation of the entity and/or the entity's name within a certain domain. For example, a company with a standardized name of "Microsoft Corporation" in an online system may include user-generated variations such as "Microsoft Corp," "Microsoft," and/or "MSFT."

As a result, conventional techniques that generate search results, recommendations, and/or other output based on an exact and/or token-based match between a user-provided input string and text in a set of documents may fail to match an entity represented by the input string to semantically related standardized entities found in the documents. Continuing with the above example, a lack of a common token between an input string of "MSFT" from a user and the standardized version of "Microsoft Corporation" in the online system may preclude documents containing the standardized version from appearing or ranking highly in search results, recommendations, and/or other output produced in response to the input string.

To improve the quality of output generated in response to user-provided input strings, the disclosed embodiments perform semantic matching of the input strings to standardized entities and include, in the output, documents that contain or are mapped to the standardized entities. For example, a search term containing an input string of "Python Engineer" is matched to a standardized job title of "Python Developer," which is used to retrieve a set of posted jobs containing the job title. The retrieved jobs are then ranked by relevance to the user performing the search and/or the context of search, and some or all of the ranked jobs are returned as search results to the user. In another example, the input string of "Python Engineer" is found in a job posting and matched to the standardized job title of "Python Developer." The job posting is annotated to include the standardized job title of "Python Developer," which allows the job posting to be included in recommendations or search results for users interested in "Python Developer," "Python Engineer," or similar jobs.

In particular, an embedding model is trained to semantically associate standardized entities with raw input strings that have substantially the same meaning. The embedding model includes one or more embedding layers that convert words and/or sequences of words in each input string into an embedding that is a vector representation of the input string in a lower dimensional vector space. The same embedding layers and/or different embedding layers of the word embedding model are also used to convert words and/or sequences of words in the standardized entity into an embedding in the same vector space.

To allow the embedding model to learn semantic relationships between the input strings and standardized entities, the embedding model is trained to predict outcomes associated with pairs of the input strings and standardized entities. For example, a positive label (e.g., 1) may be generated for an input string-standardized entity pair when positive outcomes related to output containing the standardized entity frequently occur after the input string is specified by users. These positive outcomes include, but are not limited to, the users clicking on search results containing the standardized entity after performing searches using the input string. Conversely, a negative label (e.g., 0) may be generated for an input string-standardized entity pair when non-positive outcomes related to output containing the standardized entity tend to occur after the input string is specified by users. These non-positive outcomes include, but are not limited to, the users ignoring, hiding, or dismissing search results containing the standardized entity after performing searches using the input string.

After the embedding model is trained, the embedding model generates embeddings that are closer in the latent space for a given input string-standardized entity pair with a positive label. Conversely, the embedding model produces embeddings that are farther apart in the latent space for a given input string-standardized entity pair with a negative label. Thus, the distances between embeddings of a standardized entity and an input string may reflect semantic similarities or dissimilarities between the standardized entity and input string, which in turn are represented by a positive or negative label for the standardized entity and input string.

When a new input string is received (e.g., in a search term submitted by a user), an embedding of the input string from the embedding model is compared to the embeddings of the standardized entities to identify a number of standardized entities with embeddings that are closest to the input string's embedding in the vector space. To expedite identification of these standardized entities, a hierarchy of clusters of the standardized entity embeddings is searched. The lowest level of the hierarchy contains the largest number of clusters and the smallest clusters, and the highest level of the hierarchy contains the smallest number of clusters and the largest clusters. A set of clusters in a given level of the hierarchy may be produced by merging clusters from the next lowest level of the hierarchy and/or dividing clusters from the next highest level of the hierarchy. The hierarchy may be searched from top to bottom to identify, within a cluster in the lowest level of the hierarchy, a pre-specified number of embeddings that are closest to the input string's embedding. In turn, standardized entities represented by the identified embeddings are selected as "semantically similar" to the input string.

Distances between the input string's embedding and the embeddings of the identified standardized entities are then used to generate and/or modify output that is returned in response to the input string. For example, the output includes search results that are relevant to a search term containing the input string. The search results may be populated with documents that contain the identified standardized entities, and the distance between the embedding of the input string and the embedding of the standardized entity in each document may be used as a factor that influences the position of each document in the search results.

By matching input strings from users to standardized entities that are semantically similar to the input strings, the disclosed embodiments allow documents containing the standardized entities to be retrieved in response to the input strings. As a result, search results, recommendations, and/or other output generated from the documents may include content that is semantically relevant to the input strings without requiring the content to have text-based similarity to the input strings. Moreover, standardized identities may be identified as semantically similar to the input strings by searching hierarchical clusters of embeddings of the standardized entities, which allows large numbers of input strings to be matched to standardized entities with large numbers of possible values in an efficient, scalable manner (e.g., using efficient graph traversal techniques instead of brute force calculation of distances between the input string embeddings and all standardized entity embeddings).

In contrast, conventional techniques may retrieve a set of documents in response to a user-provided input string by matching words or tokens in the input strings to appearances of the words or tokens in the documents. These techniques thus fail to identify documents that lack some or all of the input string but are semantically relevant to the input string, which reduces the usefulness of the retrieved set of documents to the user. In turn, the user may submit additional requests containing different input strings to try to retrieve other documents, which incurs additional latency, resource consumption, and/or overhead in processing the additional input strings. Thus, by improving the relevance of documents retrieved in response to user input in a scalable, efficient manner, the disclosed embodiments provide technological and performance improvements in computer systems, applications, user experiences, tools, platforms, and/or technologies related to natural language processing, processing user input, retrieving documents, conducting searches, and/or generating recommendations.

Semantic Matching and Retrieval of Standardized Entities

FIG. 1 shows a schematic of a system in accordance with the disclosed embodiments. As shown in FIG. 1, the system includes an online network 118 and/or other user community. For example, online network 118 includes an online professional network that is used by a set of entities (e.g., entity 1 104, entity x 106) to interact with one another in a professional and/or business context.

The entities include users that use online network 118 to establish and maintain professional connections, list work and community experience, endorse and/or recommend one another, search and apply for jobs, and/or perform other actions. The entities also, or instead, include companies, employers, and/or recruiters that use online network 118 to list jobs, search for potential candidates, provide business-related updates to users, advertise, and/or take other action.

Online network 118 includes a profile engine 126 that allows the entities to create and edit profiles containing information related to the entities' professional and/or industry backgrounds, experiences, summaries, job titles, projects, skills, and so on. Profile engine 126 also allows the entities to view the profiles of other entities in online network 118.

Profile engine 126 also, or instead, includes mechanisms for assisting the entities with profile completion. For example, profile engine 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search engine 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction engine 130 that allows the entities to interact with one another on online network 118. For example, interaction engine 130 may allow a user, company, school, or other entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or features. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 is logged and stored in a database, data warehouse, cloud storage, and/or other data-storage mechanism providing data repository 134.

Figure 2:
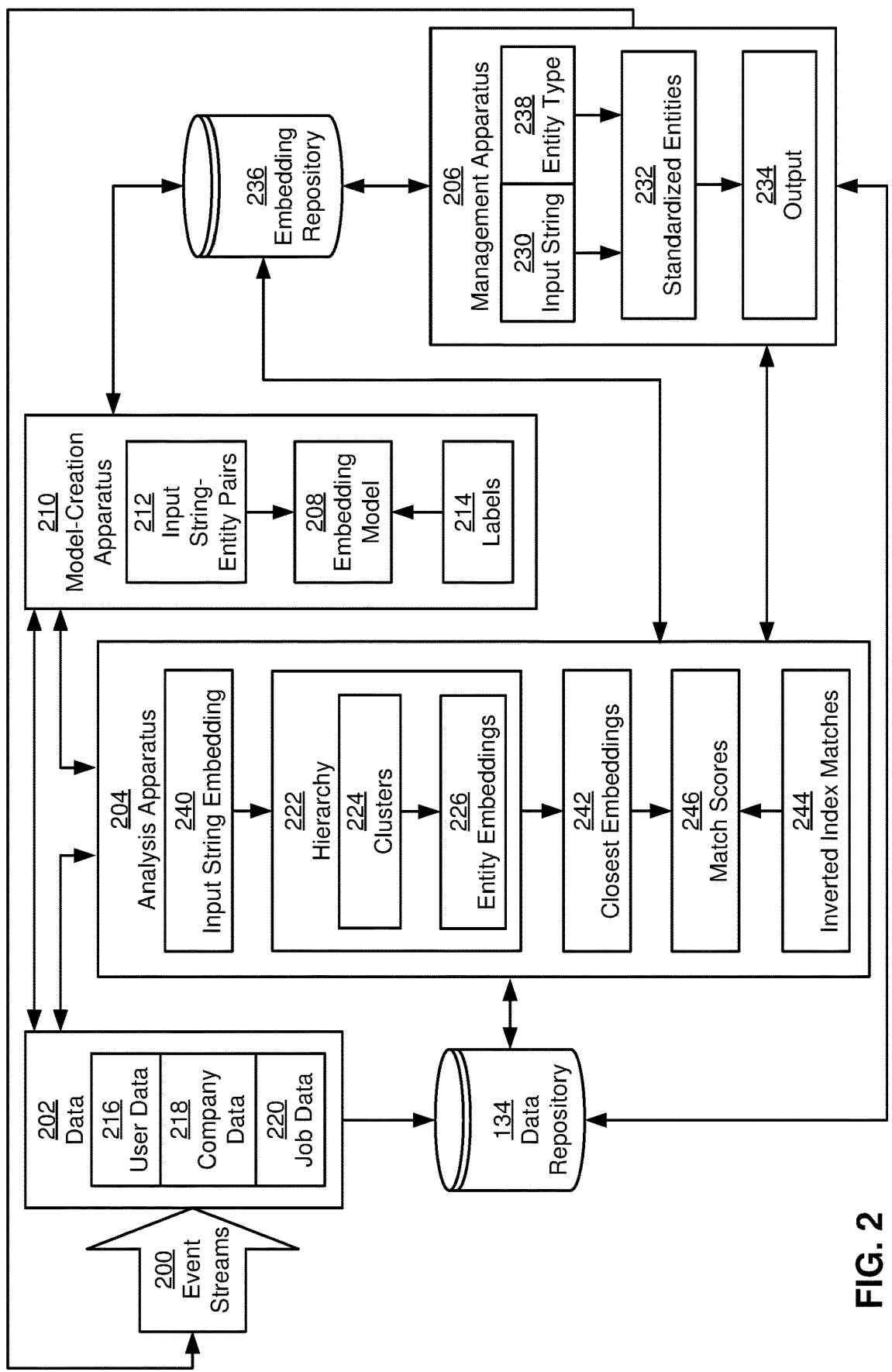
FIG. 2 shows a system for processing data in accordance with the disclosed embodiments.

As shown in FIG. 2, data 202 stored in data repository 134 includes (but is not limited to) user data 216, company data 218, and/or job data 220 (e.g., for job postings). User data 216 include attributes from user profiles within an online system (e.g., online network 118 of FIG. 1), such as the users' titles, summaries, skills, work experience, education, seniorities, industries, locations, and/or profile completeness. User data 216 also, or instead, includes each user's connections or contacts in the online system, the user's tenure on the online system (e.g., a number of days, weeks, months, or years since the user joined the online system), a set of groups to which the user belongs, awards or honors earned by the user, licenses or certifications attained by the user, and/or patents or publications associated with the user. User data 216 also, or instead, includes attributes that are specific to one or more components of the online system, such as a classification of the user as a job seeker or non-job-seeker.

In some embodiments, user data 216 characterizes the activity of the users with the online system. For example, user data 216 may include an activity level of each user, which may be binary (e.g., dormant or active) or calculated by aggregating different types of activities (e.g., user sessions over a month, page views per session, searches, clicks, etc.) into an overall activity count and/or a bucketized activity score. User data 216 also, or instead, logs impressions, clicks, likes, dislikes, shares, hides, comments, posts, updates, conversions, and/or other user interaction with content in the platform, as well as other types of activity, including connections, messages, job applications, job searches, recruiter searches for candidates, interaction between candidates and recruiters, and/or interaction with groups or events.

In some embodiments, user data 216 further includes social validations of skills, seniorities, job titles, and/or other profile attributes, such as endorsements, recommendations, ratings, reviews, collaborations, discussions, articles, posts, comments, shares, and/or other member-to-member interactions that are relevant to the profile attributes. User data 216 also, or instead, includes schedules, calendars, and/or upcoming availabilities of the users, which may be used to schedule meetings, interviews, and/or events for the users.

Company data 218 include attributes and/or metrics associated with companies. For example, company data 218 for a given company may include demographic attributes such as a location, an industry, an age, and/or a size (e.g., small business, medium/enterprise, global/large, number of employees, etc.) of the company. Company data 218 may further include a measure of dispersion in the company, such as a number of unique regions (e.g., metropolitan areas, counties, cities, states, countries, etc.) to which the employees of the company belong.

A portion of company data 218 may relate to behavior with a number of products offered by or through the online system. For example, company data 218 may include recruitment-based data, such as the number of recruiters, a potential spending of the company with a recruiting solution in the online system, a number of hires over a recent period (e.g., the last 12 months), and/or the same number of hires divided by the total number of employees and/or users of the online system in the company.

Company data 218 may also indicate a company's level of engagement with and/or presence on the online system. For example, company data 218 includes a number of employees who are users of the online system, a number of employees at a certain level of seniority (e.g., entry level, mid-level, manager level, senior level, etc.) who are users of the online system, and/or a number of employees with certain roles (e.g., engineer, manager, sales, marketing, recruiting, executive, etc.) who are users of the online system. Company data 218 may also include the number of users of the online system at the company with connections to employees of the online system, the number of connections among employees in the company, and/or the number of followers of the company in the online system. Company data 218 may further log visits to the online system from employees of the company, such as the number of employees at the company who have visited the online system over a recent period (e.g., the last 30 days) and/or the same number of visitors divided by the total number of users of the online system at the company.

At least some company data 218 may be derived from user data 216. For example, company data 216 may include measures of aggregated user activity for specific activity types (e.g., profile views, page views, jobs, searches, purchases, endorsements, messaging, content views, invitations, connections, recommendations, advertisements, etc.), user segments (e.g., groups of users that share one or more common attributes, such as members in the same location and/or industry), and companies. In turn, company data 218 may be used to glean company-level insights or trends from user-level data, perform statistical inference at the company and/or user segment level, and/or guide decisions related to activities that can be conducted by companies within the online system.

Job data 220 includes attributes of jobs posted or described within the online system. For example, job data 220 may include declared or inferred attributes of a job, such as the job's title, company, required or desired skills, responsibilities, qualifications, role, location, industry, seniority, salary range, benefits, and/or member segment. At least some job data 220 may also be derived from user data 216 and/or company data 218. For example, job data 220 may provide a context of each user's impression of a job listing or job description. The context may include a time and location (e.g., geographic location, application, website, web page, etc.) at which the job listing or description is viewed by the user. In another example, job data 220 includes count of views, clicks, applications, and/or other user actions related to a given job.

In some embodiments, data 202 in data repository 134 is combined into a graph. Nodes in the graph represent entities (e.g., users, schools, companies, locations, jobs, content etc.) in the platform. Edges between the nodes in the graph represent relationships between the corresponding entities, such as connections between pairs of users, education of users at schools, applications to jobs by users, posting of jobs by users, employment of users at companies, following of a user or company by another user, business relationships and/or partnerships between organizations, and/or residence of users at locations. The edges also, or instead, indicate actions taken by the entities, such as creating or sharing articles or posts, sending messages, sending or accepting connection requests, endorsing or recommending one another, writing reviews, applying to opportunities, joining groups, and/or following other entities.

Those skilled in the art will appreciate that data repository 134 may store other types of data 202. For example, data repository 134 includes articles, posts, images, videos, slide decks, documents, advertisements, and/or other content that is created and/or shared within the online system. Data repository 134 also, or instead, includes metadata related to the content, such as authors or creators of the content, the time at which the content was created or shared, statistics associated with the content (e.g., counts of views, likes, shares, or other types of interaction with the content), and/or users that have interacted with the content.

Data 202 in data repository 134 can be updated using records of recent activity received over one or more event streams 200. For example, event streams 200 are generated and/or maintained using a distributed streaming platform. One or more event streams 200 are also, or instead, provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent activity within or outside the online system is generated in response to the activity. The record is then propagated to components subscribing to event streams 200 on a nearline basis.

In one or more embodiments, some or all data 202 in data repository 134 is standardized before data 202 is used by components of the system. In these embodiments, standardization of data 202 refers to the conversion or mapping of fields in data 202 into a consistent format. For example, skills in user data 216 and/or job data 220 are organized into a hierarchical taxonomy that is stored in data repository 134 and/or another repository. The taxonomy models relationships between skills (e.g., "Java programming" is related to or a subset of "software engineering") and/or standardizes identical or highly related skills (e.g., "Java programming," "Java development," "Android development," and "Java programming language" are standardized to "Java").

In another example, locations in data repository 134 include cities, metropolitan areas, states, countries, continents, and/or other standardized geographical regions. Like standardized skills, the locations can be organized into a hierarchical taxonomy (e.g., cities are organized under states, which are organized under countries, which are organized under continents, etc.).

In a third example, data repository 134 includes standardized company names for a set of known and/or verified companies associated with the members and/or jobs. In a fourth example, data repository 134 includes standardized titles, seniorities, and/or industries for various jobs, users, and/or companies in the online network. In a fifth example, data repository 134 includes standardized time periods (e.g., daily, weekly, monthly, quarterly, yearly, etc.) that can be used to retrieve profile data 216, user activity data 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

In some embodiments, strings representing standardized attributes in data repository 134 are mapped to unique identifiers (IDs) in the corresponding taxonomies. For example, each standardized skill is represented by a numeric skill ID in data repository 134, each standardized title is represented by a numeric title ID in data repository 134, each standardized location is represented by a numeric location ID in data repository 134, and/or each standardized company name (e.g., for companies that exceed a certain size and/or level of exposure in the online system) is represented by a numeric company ID in data repository 134.

Data 202 in data repository 134 may then be used to generate recommendations, search results, and/or other output 234 related to users, companies, schools, groups, content, jobs, and/or other entities within the online system. For example, one or more components may track searches, clicks, views, text input, conversions, and/or other feedback during the entities' interaction with the online system. The feedback may be stored in data repository 134 and used as training data for one or more machine learning models, and the output of the machine learning model(s) may be used to display and/or otherwise recommend jobs, advertisements, posts, articles, connections, products, companies, groups, and/or other types of content, entities, or actions to users of the online system.

Moreover, standardization of fields in data 202 may improve analysis of the data by the machine learning model(s), as well as use of data 202 with products in and/or associated with the online system. For example, transformation of a set of related and/or synonymous skills into the same standardized skill of "Java" may improve the performance of a machine learning model that uses the skills to generate recommendations, scores, predictions, classifications, and/or other output that is used in features and/or interactions in the online system. In another example, a search for users with skills that match "Java development" may be matched to a group of users with the same standardized skill of "Java," which is returned in lieu of a smaller group of users that specifically list "Java development" as a skill. In a third example, standardization of a first company's name into the name of a second company that acquired the first company may allow a link to the first company in a member profile to be redirected to a company page for the second company in the online system.

A management apparatus 206 uses standardized entities 232 in user data 216, company data 218, job data 220, and/or other data 202 in data repository 134 to generate output 234 in response to user-specified input. More specifically, management apparatus 206 receives a user-specified input string 230 associated with an entity type 238, matches input string 230 to one or more standardized entities 232 of the same entity type 238, and generates output 234 that includes and/or is mapped to standardized entities 232. For example, management apparatus 206 matches a search term containing a value of "Python Engineer" for input string 230 and a value of "job title" entity type 238 to a standardized job title of "Python Developer." Management apparatus 206 retrieves a set of posted jobs containing the "Python Developer" job title, ranks the jobs by relevance to the user performing the search and/or the context of search, and generates, as output 234, search results containing some or all of the ranked jobs. In another example, management apparatus 206 identifies the same input string 230 of "Python Engineer" in the "job title" field of a job posting, matches input string 230 to the same standardized job title of "Python Developer," and generates output 234 that annotates or maps the job posting to the "Python Developer" job title. The job posting may then be included in recommendations or search results for users interested in "Python Developer," "Python Engineer," or similar jobs and/or users that list these job titles in their profiles.

Entity type 238 indicates a named entity associated with input string 230. In the context of an online network, entity type 238 may include (but is not limited to) a job, company, user, school, skill, seniority, function, industry, time, and/or location. Entity type 238 may be obtained from structured data related to input string 230 (e.g., when input string 230 is found in a field representing entity type 238 in a structured search and/or structured data 202 in data repository 134).

Entity type 238 may also, or instead, be identified based on analysis of input string 230 and/or the context in which input string 230 was obtained. For example, management apparatus 206 may apply a semi-Markov conditional random field model, bidirectional transformer encoder model, and/or another type of named entity recognition (NER) model to a phrase, sentence, paragraph, document, search term, and/or other text containing input string 230. In turn, the NER model outputs one or more "tags" that map words or sequences of words in the text to one or more entity types. Each word or sequence of words that is tagged with any entity type 238 of interest (e.g., an entity type that is used to generate recommendations, search results, notifications, and/or other output 234 in the online system) is then included in a separate input string 230 for subsequent matching to standardized entities 232 of the same entity type 238.

In one or more embodiments, input string 230 is matched to standardized entities 232 associated with entity type 238 based on semantic similarity to standardized entities 232. In these embodiments, the semantic similarity (or distance) between input string 230 and standardized entities 232 is evaluated using an input string embedding 240 that is generated from input string 240 and a set of entity embeddings 226 generated from standardized entities 232.

In some embodiments, input string embedding 240 and entity embeddings 226 are generated by applying an embedding model 208 to input string 230 and standardized entities 232, respectively. For example, embedding model 208 includes a word2vec model, fastText model, Global Vectors for Word Representation (GloVe) model, Embeddings from language models (ELMo) model, transformer, convolutional neural network, recurrent neural network, and/or another type of machine learning model. Embedding model 208 includes one or more embedding layers that convert one-hot encoded and/or bag-of-words representations of tokens, character sequences, phrases, and/or other components of one or more strings (e.g., input string 230, standardized entities 232, etc.) into one or more embedding s (e.g., input string embedding 240, entity embeddings 226). Each embedding includes a fixed-length vector representation of the corresponding string in a lower-dimensional vector space. Embedding model 208 optionally includes one or more prediction layers after the embedding layer(s). These prediction layers analyze the output of the embedding layers to produce scores related to the strings, such as predicted likelihoods of classes or outcomes associated with the strings.

A model-creation apparatus 210 trains embedding model 208 to generate embeddings that reflect semantic relationships between standardized entities 232 and user-generated input strings (e.g., input string 230). As shown in FIG. 2, training data for embedding model 208 includes input string-entity pairs 212 and labels 214 from data repository 134 and/or another data store. In some embodiments, input string-entity pairs 212 include pairs of input strings and standardized entities 232 with the same entity types (e.g., entity type 238), and labels 214 represent outcomes for the corresponding input string-entity pairs 212.

In one or more embodiments, model-creation apparatus 210 and/or another component obtain input strings in the training data from search terms inputted by users for various types of searches (e.g., job searches, company searches, sitewide searches, etc.) supported by the online system. The component also, or instead, obtains user-generated input strings from fields in the users' profiles (e.g., the users' job histories), job postings, company pages, and/or other types of data 202 in data repository 134. The component associates the input strings with additional actions performed by the users, such as clicks on search results, posted jobs, company pages, and/or other content related to standardized entities 232 in the online system.

These actions are used to determine outcomes and the corresponding labels 214 between the input strings and standardized entities 232. For example, when a certain number or proportion of users (e.g., greater than 50% of at least 1,000 users) perform a sequence of actions that establishes a positive association between an input string and a standardized entity of the same entity type 238, the component generates a positive label of 1 for the input string-entity pair. The action includes, but is not limited to, clicking on a search result containing the standardized entity (or the input string) after performing a search that includes the input string (or the standardized entity); applying to a job containing the standardized entity (or input string) with a profile that lists the input string (or standardized entity); and/or opening an article that includes the input string (or standardized entity) after subscribing to a topic represented by the standardized entity (or input string). Conversely, the component generates a negative label of 0 for randomly sampled input string-standardized entity pairs 212 that lack these types of actions or positive associations (e.g., random pairs of input strings and standardized entities 232 that are not semantically linked via clicks or other types of user actions).

In other words, each record in the training data includes a user-generated input string and a standardized entity that are inputted as features into embedding model 208, along with a corresponding label indicating whether or not the input string is frequently linked to the standardized entity via certain sequences or types of user actions. In turn, these sequences of user actions are used as indicators of strong semantic similarity between the corresponding input strings and standardized entities.

After input string-entity pairs 212 and labels 214 for training embedding model 208 are generated and/or collected, model-creation apparatus 210 trains embedding model 208 using input string-entity pairs 212 and labels 214. For example, model-creation apparatus 210 inputs each input string-entity pair into embedding model 208 and obtains, as output from embedding model 208, a value between 0 and 1 representing the likelihood that the input string and standardized entity in the pair are semantically similar. Model-creation apparatus 210 then uses a training technique (e.g., gradient descent and backpropagation), a loss function (e.g., cross entropy), and/or one or more hyperparameters to update parameter values of embedding model 208 in a way that reduces the error between the output of embedding model 208 and the corresponding labels 214.

After embedding model 208 is trained and/or updated, model-creation apparatus 210 uses embedding model 208 to generate entity embeddings 226 for all standardized entities 232 of the corresponding entity type 238. For example, model-creation apparatus 210 may create a different version of embedding model 208 for each entity type 238 (e.g., company, job, title, skill, industry, location, etc.) associated with standardized entities 232 in the online system. Within a given version of embedding model 208, model-creation apparatus uses one or more words and/or a sequence of text in a standardized entity as one or more indexes into a weight matrix from an embedding layer of embedding model 208. One or more rows represented by the index(es) in the weight matrix are then retrieved, and an entity embedding for the standardized entity is produced from values of the rows (e.g., by averaging or otherwise aggregating the rows into a single vector).

In another example, model-creation apparatus 210 inputs a sequence of tokens in a standardized entity (e.g., "Senior Software Engineer" in a standardized job title, "Machine Learning" in a standardized skill, etc.) into a Bidirectional Encoder Representations from Transformers (BERT) model and/or another type of bidirectional transformer encoder. Model-creation apparatus 210 obtains an entity embedding for the standardized entity from the last hidden layer produced by the BERT model from a classification token that is added to the beginning of the sequence. Model-creation apparatus 210 also, or instead, uses a max pooling and/or other operation to aggregate vectors in the last hidden layer of the BERT model produced from individual tokens in the sequence to generate an entity embedding for the standardized entity.

Model-creation apparatus 210 additionally stores standardized entities 232 and/or the corresponding entity embeddings 226 in an embedding repository 236. For example, embedding repository 236 may include a key-value store. After entity embeddings 226 are created by embedding model 208 from a set of standardized entities 232, model-creation apparatus 210 may store a mapping between each standardized entity and the corresponding embedding in the key-value store. The standardized entity may then be used as a key that is used to retrieve the corresponding embedding from the key-value store.

After a given input string 230 is received by management apparatus 206 (e.g., in a search term, profile edit, job posting, article, and/or another sequence of text submitted by a user), an analysis apparatus 204 analyzes input string 230 for semantic and/or other types of similarity to standardized entities 232 of the same entity type 238. First, analysis apparatus 204 uses embedding model 208 to generate a corresponding input string embedding 240 from input string 230. Next, analysis apparatus 204 identifies a set of entity embeddings 226 that are closest embeddings 242 to input string embedding 240 in the vector space. For example, analysis apparatus 204 calculates a distance between input string embedding 240 and a standardized entity embedding as a cosine similarity, Euclidean distance, and/or another measure of vector similarity or distance. Analysis apparatus 204 then selects a pre-specified number of entity embeddings 226 with the lowest distances to input string embedding 240 and/or a variable number of entity embeddings 226 with distances to input string embedding 240 that fall below a numeric threshold as closest embeddings 242.

In one or more embodiments, analysis apparatus 204 reduces overhead, complexity, and/or latency associated with identifying closest embeddings 242 by searching a hierarchy 222 of clusters 224 of entity embeddings 226 for closest embeddings 242. In some embodiments, hierarchy 222 includes multiple levels of clusters 224 of entity embeddings 226, with clusters 224 in lower levels of hierarchy 222 merged into fewer numbers of larger clusters 224 in higher levels of hierarchy 222 and/or clusters 224 in higher levels of hierarchy 222 divided into greater numbers of smaller clusters 224 in lower levels of hierarchy. Analysis apparatus 204 may create hierarchy 222 from entity embeddings 226 stored in embedding repository 236. Alternatively, analysis apparatus 202 may retrieve hierarchy 222 from embedding repository 236 after hierarchy 222 is created by model-creation apparatus 210 and/or another component.

To identify closest embeddings 242, analysis apparatus 204 performs a top-down search of hierarchy 222, beginning at the highest level and ending at the lowest level. At the highest level of hierarchy 222, analysis apparatus 204 identifies one or more clusters 224 that are closest to input string embedding 240 (e.g., based on distances between the centroids of clusters 224 in the highest level and input string embedding 240 in the embedding space). Analysis apparatus 204 recursively repeats the process with additional clusters 224 that are grouped under the identified cluster(s) in a lower level of hierarchy 222 until a cluster with a centroid that is closest to input string embedding 240 is found in the lowest level of hierarchy 222. Analysis apparatus 204 then identifies closest embeddings 242 as a subset of embeddings in the cluster are within a threshold (e.g., quantile threshold, numeric threshold, etc.) distance to input string embedding 240 in the vector space.

Figure 3:
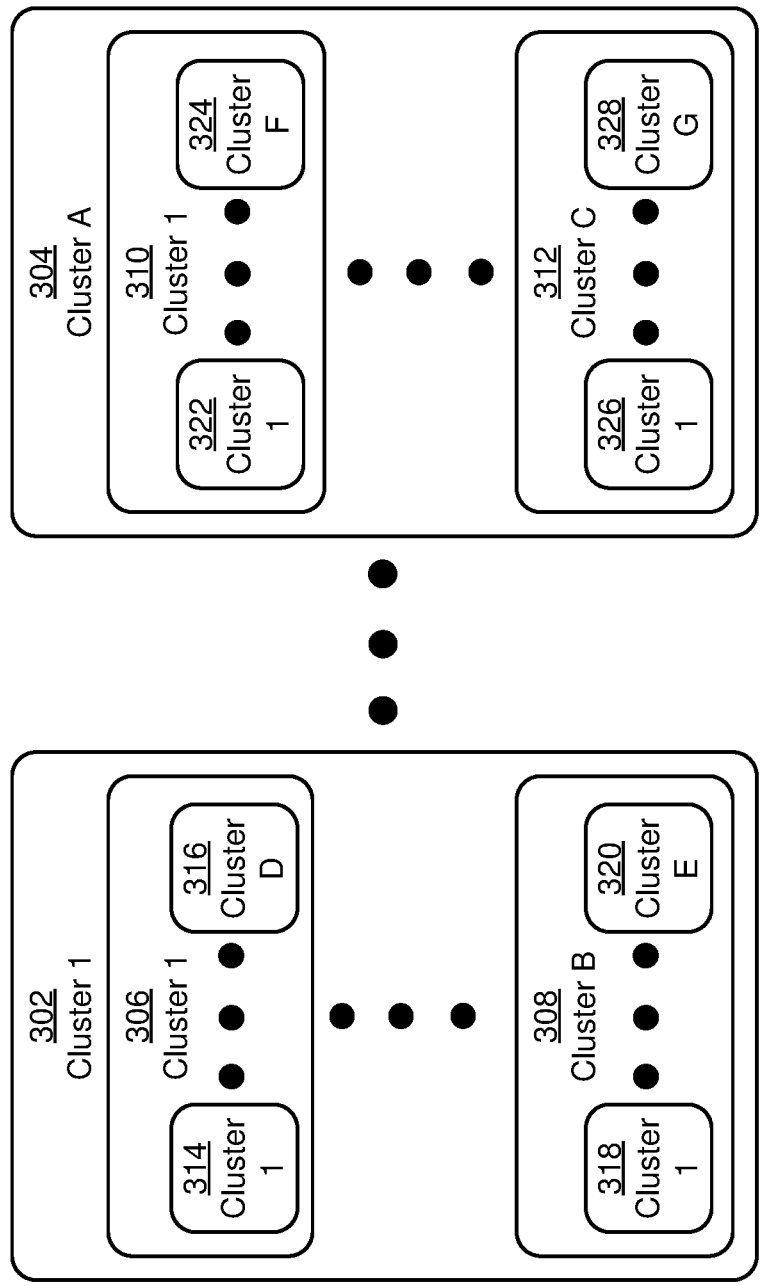
FIG. 3 shows an example hierarchy of clusters of embeddings of standardized entities in accordance with the disclosed embodiments.

The operation of analysis apparatus 204 may be illustrated using the example hierarchy of clusters of FIG. 3. As shown in FIG. 3, the hierarchy includes a small number of clusters (e.g., cluster 1 302, cluster A 304) at a highest (e.g., root) level of the hierarchy. Each cluster in the highest level is composed of multiple smaller clusters in a middle level of the hierarchy. In particular, cluster 1 302 includes one set of clusters (e.g., cluster 1 306, cluster B 308) in the middle level, and cluster A 304 includes a disjoint set of clusters (e.g., cluster 1 310, cluster C 312) in the middle level.

In turn, each cluster in the middle level is composed of multiple smaller clusters in a lowest level of the hierarchy. In the middle level, cluster 1 306 include a first set of clusters (e.g., cluster 1 314, cluster D 316), cluster B 308 includes a second set of clusters (e.g., cluster 1 318, cluster E 320), cluster 1 310 includes a third set of clusters (e.g., cluster 1 322, cluster F 324), and cluster C 312 includes a fourth set of clusters (e.g., cluster 1 326, cluster G 328). The first, second, third, and fourth sets of clusters are disjoint.

Each cluster in the hierarchy is composed of embeddings of standardized entities (e.g., entity embeddings 226 of FIG. 2). Clusters in the lowest level of the hierarchy (e.g., cluster 1 314, cluster D 316, cluster 1 318, cluster E 320, cluster 1 322, cluster F 324, cluster 1 326, cluster G 328) contain the smallest number of embeddings, clusters in the middle level of the hierarchy (e.g., cluster 1 306, cluster B 308, cluster 1 310, cluster C 312) contain larger numbers of entities than clusters in the lowest level, and clusters in the highest level of the hierarchy (e.g., cluster 1 302, cluster A 304) contain the largest numbers of entities in the hierarchy.

The hierarchy of FIG. 3 may be created in an agglomerative (e.g., bottom-up) or divisive (e.g., top-down) approach. The agglomerative approach uses k-means and/or another centroid-based clustering technique to generate clusters at the lowest level of the hierarchy. Pairs or groups of clusters with centroids that are closest to one another in the lower level are merged into larger clusters at the middle of the hierarchy, and pairs or groups of clusters with centroids that are closest to one another in the middle of the hierarchy are merged into larger clusters at the highest level of the hierarchy.

The divisive approach uses a centroid-based clustering technique to generate a number of clusters at the highest level of the hierarchy. Each cluster at the highest level is divided into two or more clusters in the middle level (e.g., by applying the same clustering technique to embeddings in the cluster), and the process is repeated for each cluster in the middle level to produce clusters at the lowest level of the hierarchy.

While the example cluster hierarchy of FIG. 3 is illustrated using three levels of clusters, those skilled in the art will appreciate that hierarchies of clusters of embeddings may include variable numbers of levels, clusters in each level, and/or embeddings in clusters of a given level. For example, the hierarchy may be generated to include a pre-specified number of clusters at a given level, a certain number of levels, a certain ratio of clusters from one level of the hierarchy to the next level of the hierarchy, and/or another attribute related to the structure of the hierarchy.

The hierarchy may be searched for a cluster in the lowest level with a centroid that is closest to a target embedding, such as input string embedding 240 of FIG. 2. The search begins at the highest level of the hierarchy and identifies a subset of clusters in the highest level with centroids that are closest to the target embedding (e.g., based on a measure of vector similarity or distance between each centroid and the target embedding). The identified clusters are ordered in a priority queue by ascending distance to the target embedding, and the cluster at the front of the priority queue is removed and "expanded" into a set of child clusters at the next lowest level of the hierarchy. The child clusters are inserted into the priority queue to reflect the ordering by distance to the target embedding, and the process is repeated until a cluster in the lowest level is identified to have a centroid with a distance that is shorter than that of any other cluster centroid in the priority queue. Distances between the target embedding and embeddings in the identified cluster are then calculated and used to identify a subset of the embeddings that are closest to the target embedding in the embedding space (e.g., closest embeddings 242 of FIG. 2), as described above.

As a result, the hierarchy allows the closest embeddings to be identified using efficient graph traversal techniques. For example, a brute force search involves calculating and comparing distances between the target embedding and all standardized embeddings for a given entity type 238. On the other hand, searching the hierarchy for the closest embeddings includes a time complexity that is bounded by a much smaller number, which is the sum of the number of edges in the hierarchy (e.g., from identifying the lowest-level cluster in the hierarchy that is closest to the target embedding) and the number of embeddings in one cluster in the lowest level of the hierarchy (from searching embeddings within the identified cluster for the closest subset of embeddings to the target embedding). Consequently, the hierarchy supports scalable, low-latency semantic matching of input strings to standardized entities.

Returning to the discussion of FIG. 2, analysis apparatus 204 also generates a set of inverted index matches 244 between input string 230 and standardized entities 232 of the same entity type 238. In some embodiments, inverted index matches 244 include standardized entities 232 that are retrieved from entries of an inverted index using keys that include one or more tokens in input string 230. For example, analysis apparatus 204 may access the inverted index as a component of data repository 134 and/or another data store. Each entry in the inverted index includes a key representing one or more tokens in standardized entities 232, which is mapped to a set of standardized entities 232 that contain the token(s).

As a result, analysis apparatus 204 may generate inverted index matches 224 by performing lookups of the inverted index using individual tokens in input string 230 and retrieving standardized entities 232 from the corresponding inverted index entries. Continuing with the above example, analysis apparatus 204 may obtain inverted index matches 224 for a value of "python developer" in input string 230 by performing a first lookup of the inverted index using "python" and performing a second lookup of the inverted index using "developer." In turn, inverted index matches 224 include all standardized entities 232 of the same entity types 238 as input string 230 that contain the "python" or "developer" tokens.

Analysis apparatus 204 then calculates match scores 246 between input string 230 and standardized entities 232 represented by closest embeddings 242 and/or inverted index matches 244. In one or more embodiments, match scores 246 include numeric values that represent semantic and/or other similarities between input string 230 and standardized entities 232 represented by closest embeddings 242 and/or inverted index matches 244 (e.g., standardized entities 232 identified via either closest embeddings 242 or inverted index matches 244). A higher match score indicates a greater similarity between input string 230 and a corresponding standardized entity, and a lower match score indicates a lower similarity between input string 230 and the corresponding standardized entity.

In one or more embodiments, match scores 246 include a set of embedding match scores calculated between input string embedding 240 and entity embeddings 226 of standardized entities 232 associated with closest embeddings 242 and/or inverted index matches 244. Match scores 246 also, or instead, include a set of similarity match scores calculated between input string 230 and the same standardized entities 232. The embedding match scores and similarity match scores may then be combined into an overall set of match scores 246 between input string 230 and standardized entities 232 represented by closest embeddings 242 and/or inverted index matches 244.

For example, analysis apparatus 204 calculates an embedding match score between input string embedding 240 and an entity embedding for each standardized entity associated with closest embeddings 242 or inverted index matches 244 as the distance between the two embeddings in the embedding space. Analysis apparatus 204 also calculates a similarity match score between input string 230 and the standardized entity as an edit distance and/or another measure of string-based similarity. Analysis apparatus 204 then generates an overall match score between input string 230 and the standardized entity as a linear combination of the embedding match score and similarity match score. Weights used in the linear combination may be selected or adjusted manually and/or using a regression technique.

Analysis apparatus 204 also, or instead, uses the embedding match scores to filter one or more standardized entities 232 identified via closest embeddings 242 and/or inverted index matches 244. For example, analysis apparatus 204 may compare each embedding match score to a numeric threshold. If the embedding match score falls below the threshold (e.g., if input string 230 and a standardized entity associated with the embedded match score have a greater than threshold semantic dissimilarity), analysis apparatus 204 may omit calculation of an overall match score between input string 230 and the standardized entity. In turn, the standardized entity may be excluded from the generation of output 234 related to input string 230.

After match scores 246 are generated between input string 230 and standardized entities 232 associated with closest embeddings 242 and/or inverted index matches 244, analysis apparatus 204 generates a ranking of standardized entities 232 by descending match scores 246 and provides the ranking to management apparatus 206. Management apparatus 206 uses the ranking to select a subset of standardized entities 232 with the highest match scores 246 and generates output 234 related to the selected subset of standardized entities 232.

For example, management apparatus 206 selects a certain number of highest-ranked standardized entities 232 (e.g., the top 10, 100, etc.) and/or a variable number of standardized entities with match scores 246 that exceed a numeric threshold from the ranking. Next, management apparatus 206 retrieves, from data repository 134 and/or another data store, a set of documents (e.g., job postings, content, user profiles, company pages, etc.) containing the selected standardized entities 232. For each of the documents, management apparatus 206 inputs, into one or more machine learning models, a match score between input string 230 and a corresponding standardized entity in the document, as well as additional features related to the user from which input string 230 was received and/or the document. The machine learning model(s) output a relevance score representing the likelihood of a positive outcome between the user and document (e.g., the user clicking on the document, the user liking the document, the user saving the document, the user applying to a job represented by the document, etc.).

Continuing with the above example, management apparatus 206 ranks the documents by descending relevance score. Finally, management apparatus 206 includes some or all of the ranked documents in output 234, which can include (but is not limited to) search results (e.g., in response to a user's search containing input string 230), recommendations (e.g., for a user with a profile that includes input string 230), notifications, alerts, emails, and/or messages. Subsequent responses by the user to output 234 (e.g., clicks, likes, saves, shares, ignores, dismisses, hides, etc.), may, in turn, be used to generate events that are fed back into the system via event streams 200 and used to update embedding model 208, entity embeddings 226, clusters 224, hierarchy 222, match scores 246, standardized entities 232, and/or output 234 related to input string 230.

Those skilled in the art will appreciate that the system of FIG. 2 may be implemented in a variety of ways. First, analysis apparatus 204, model-creation apparatus 210, management apparatus 206, data repository 134, and/or embedding repository 236 may be provided by a single physical machine, multiple computer systems, one or more virtual machines, a grid, one or more databases, one or more filesystems, and/or a cloud computing system. Analysis apparatus 204, model-creation apparatus 210, and management apparatus 206 may additionally be implemented together and/or separately by one or more hardware and/or software components and/or layers.

Second, a number of machine learning models and/or techniques may be used to generate input string embedding 240, entity embeddings 226, clusters 224, hierarchy 222, match scores 246, and/or output 234. For example, the functionality of embedding model 208 may be provided by various types of neural network, deep learning, and/or embedding model architectures. Multiple versions of embedding model 208 may be adapted to different entity types and/or sources of user-provided input strings (e.g., posted jobs, searches, user profiles, etc.), or the same embedding model 208 may be used to generate embeddings of all types of standardized entities 232 and/or input strings in the online system. The retraining or execution of each version of embedding model 208 may also be performed on an offline, online, and/or on-demand basis to accommodate requirements or limitations associated with the processing, performance, or scalability of the system and/or the availability of input string-entity pairs 212 and labels 214 used to train embedding model 208. Similarly, various types of hierarchical clustering techniques may be used to produce clusters 224 and/or hierarchy 222, and match scores 246 may be produced via different types and/or combinations of metrics related to input string embedding 240, entity embeddings 226, input string 230, and/or inverted index matches 244.

Third, the system of FIG. 2 may be adapted to generate output 234 for various entity types and/or sources of input strings. For example, the functionality of the system may be used to match user-provided input strings to standardized representations of products, services, clubs, groups, events, topics, academic subjects, interests, and/or other types of entities. In another example, the system may accept input strings from user-generated posts, articles, voice input (e.g., after a speech-to-text technique is used to convert the voice input into text), and/or other types of content.

Figure 4:
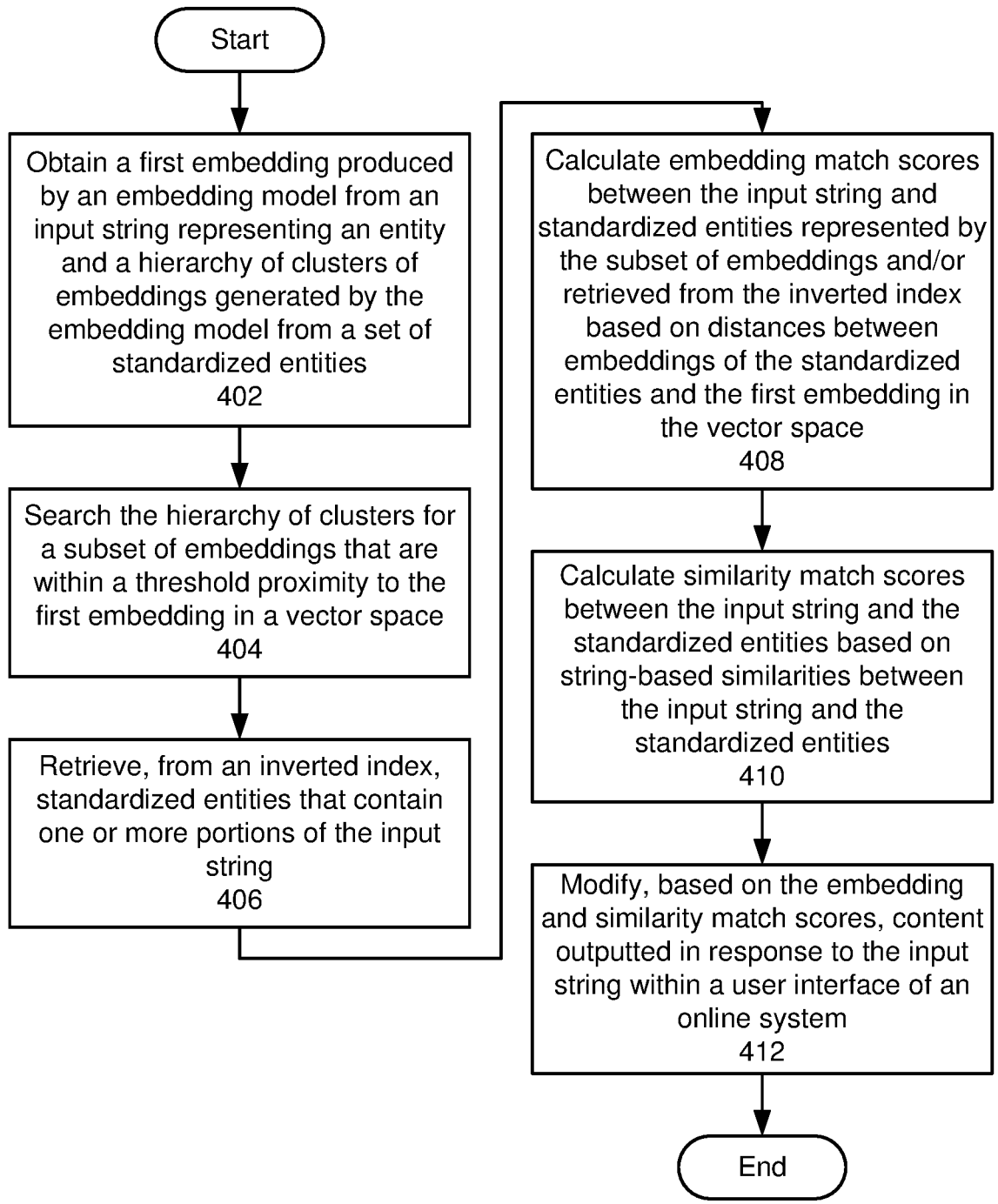
FIG. 4 shows a flowchart illustrating the processing of user-generated input in accordance with the disclosed embodiments.

FIG. 4 shows a flowchart illustrating the processing user-generated input in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a first embedding produced by an embedding model from an input string representing an entity and a hierarchy of clusters of embeddings generated by the embedding model from a set of standardized entities are obtained (operation 402). Creation of the embedding model and the hierarchy is described in further detail below with respect to FIG. 5.

Next, the hierarchy of clusters is searched for a subset of embeddings that are within a threshold proximity to the first embedding in a vector space (operation 404). For example, the hierarchy is searched in a top-down fashion, starting with the largest clusters at a highest (e.g., root) level of the hierarchy and ending with a cluster at the lowest (e.g., leaf) level of the hierarchy. The clusters at the highest level are inserted into a priority queue that orders the clusters by ascending distances between the clusters' centers and the first embedding. The cluster at the front of the priority queue is expanded into a set of child clusters (e.g., a set of clusters grouped under the cluster) in the next highest level of the hierarchy, and the child clusters are inserted into the priority queue in a way that preserves the ordering by distances between the clusters' centers and the first embedding. The process of expanding each cluster at the front of the priority queue into child clusters at the level below the cluster in the hierarchy and inserting the child clusters into the priority queue is repeated until the front of the priority queue contains a cluster at the lowest level of the hierarchy that has a center that is closer to the first embedding in the vector space than any other clusters in the priority queue. This cluster is then searched for the subset of embeddings that are within a threshold distance to the first embedding in the vector space.

A second subset of standardized entities that contain one or more portions of the input string are retrieved from an inverted index (operation 406). For example, the second subset of standardized entities may be retrieved using inverted index lookups of individual tokens in the input string.

Embedding match scores are calculated between the input string and standardized entities represented by the subset of embeddings and/or retrieved from the inverted index based on distances between embeddings of the standardized entities and the first embedding in the vector space (operation 408). For example, the embedding match scores are calculated as cosine similarities, Euclidean distances, and/or other measures of vector distance or similarity between the first embedding and each standardized entity embedding.

Similarity match scores are also calculated between the input string and the standardized entities based on string-based similarities between the input string and the second subset of standardized entities (operation 410). For example, the similarity match scores are calculated as edit distances between the input string and the standardized entities. Content outputted in response to the input string within a user interface of an online system is then modified based on the embedding and similarity match scores, as described in further detail below with respect to FIG. 6 (operation 412).

Figure 5:
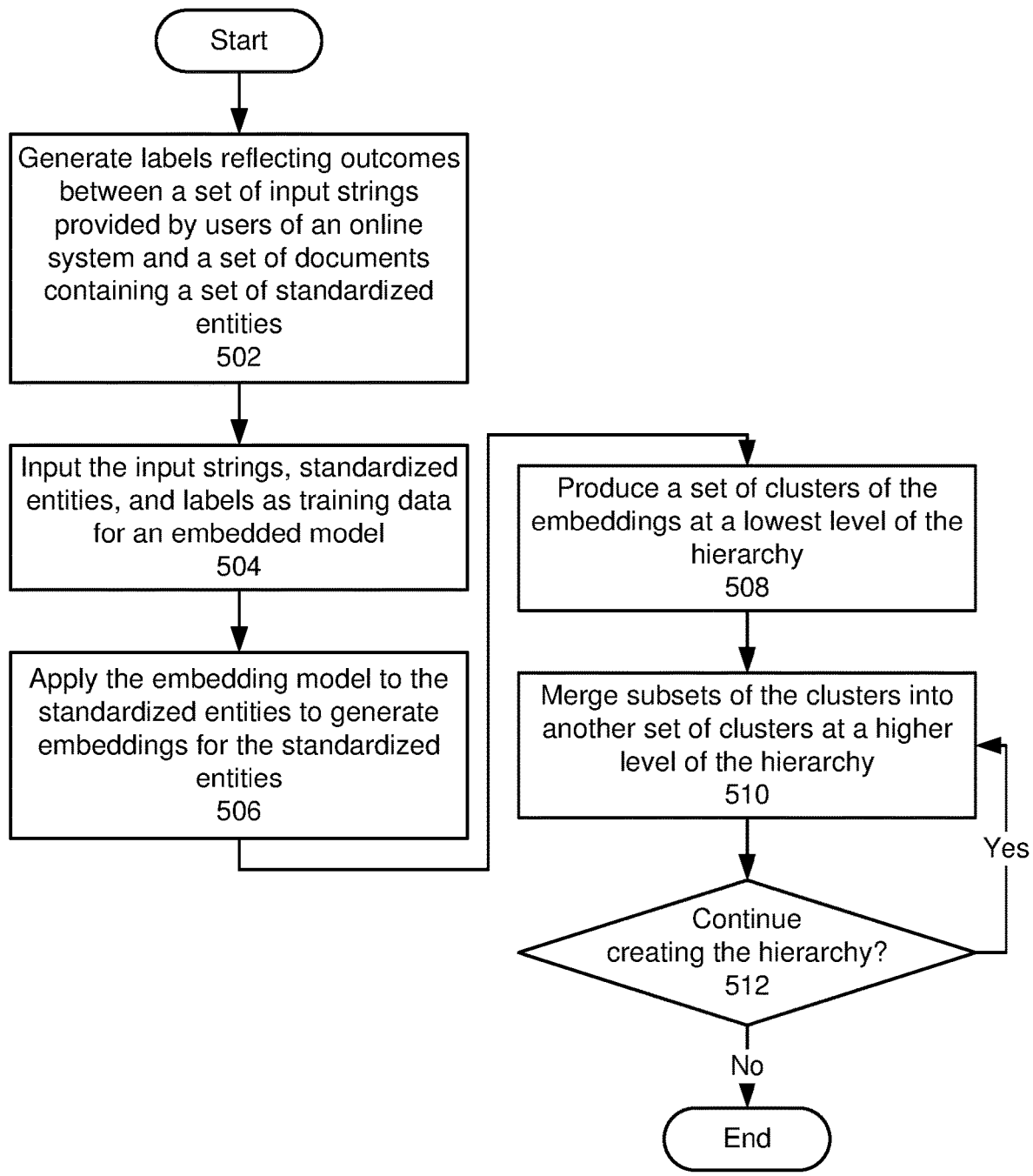
FIG. 5 shows a flowchart illustrating a process of generating a hierarchy of clusters of embeddings of standardized entities in accordance with the disclosed embodiments.

FIG. 5 shows a flowchart illustrating a process of generating a hierarchy of clusters of embeddings of standardized entities in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, labels reflecting outcomes associated with a set of input strings provided by users of an online system and a set of documents containing a set of standardized entities are generated (operation 502). For example, the input strings may be obtained from searches, profile edits, and/or other historical activity by the users with the online system. Each input string represents a named entity in the online system, such as a company, industry, title, and/or skill. When an input string is associated with a high and/or frequent occurrence of a subsequent user action on a standardized entity (e.g., clicking on a search result containing the standardized entity after a search term containing the input string is submitted), a positive label of 1 is assigned to the input string and standardized entity. Conversely, a negative label of 0 is assigned to an input string that is not semantically linked to a standardized entity via user actions.

Next, the input strings, standardized entities, and labels are inputted as training data for an embedding model (operation 504). For example, the embedding model may be trained to predict a label based on a first sequence of text containing an input string and a second sequence of text containing a standardized entity. As a result, embeddings produced by the embedding model from a given input string-standardized entity pair may be closer to one another in the vector space when the label is positive (e.g., 1) and farther apart when the label is negative (e.g., 0).

The trained embedding model is then applied to the standardized entities to generate embeddings for the standardized entities (operation 506). For example, a bag-of-words, sequential, and/or another representation of text in each standardized entity is inputted into one or more embedding layers of the embedding model, and an embedding of the standardized entity is obtained as output from the embedding layer(s).

The embeddings are then grouped into the hierarchy of clusters. In particular, a set of clusters of embeddings is produced at a lowest level of the hierarchy (operation 508). For example, k-means clustering and/or another clustering technique is used to produce a certain number of clusters at the lowest level. Subsets of the clusters are then merged into another set of clusters at a higher level of the hierarchy (operation 510). For example, a certain number of clusters in the lowest level is merged into a single cluster at the next level of the hierarchy.

Operation 510 may be repeated to continue creating the hierarchy (operation 512). For example, operation 510 may be repeated to add more levels to the hierarchy until the highest level of the hierarchy includes a certain number of clusters and/or the hierarchy includes a certain number of levels. Alternatively, operations 508-512 may be replaced with steps that produce clusters at the highest level of the hierarchy and recursively divided the clusters into larger numbers of clusters at lower levels of the hierarchy until the lowest level of the hierarchy is reached. The hierarchy may then be used to identify standardized entity embeddings that are closest in the vector space to an input string embedding, as discussed above.

Figure 6:
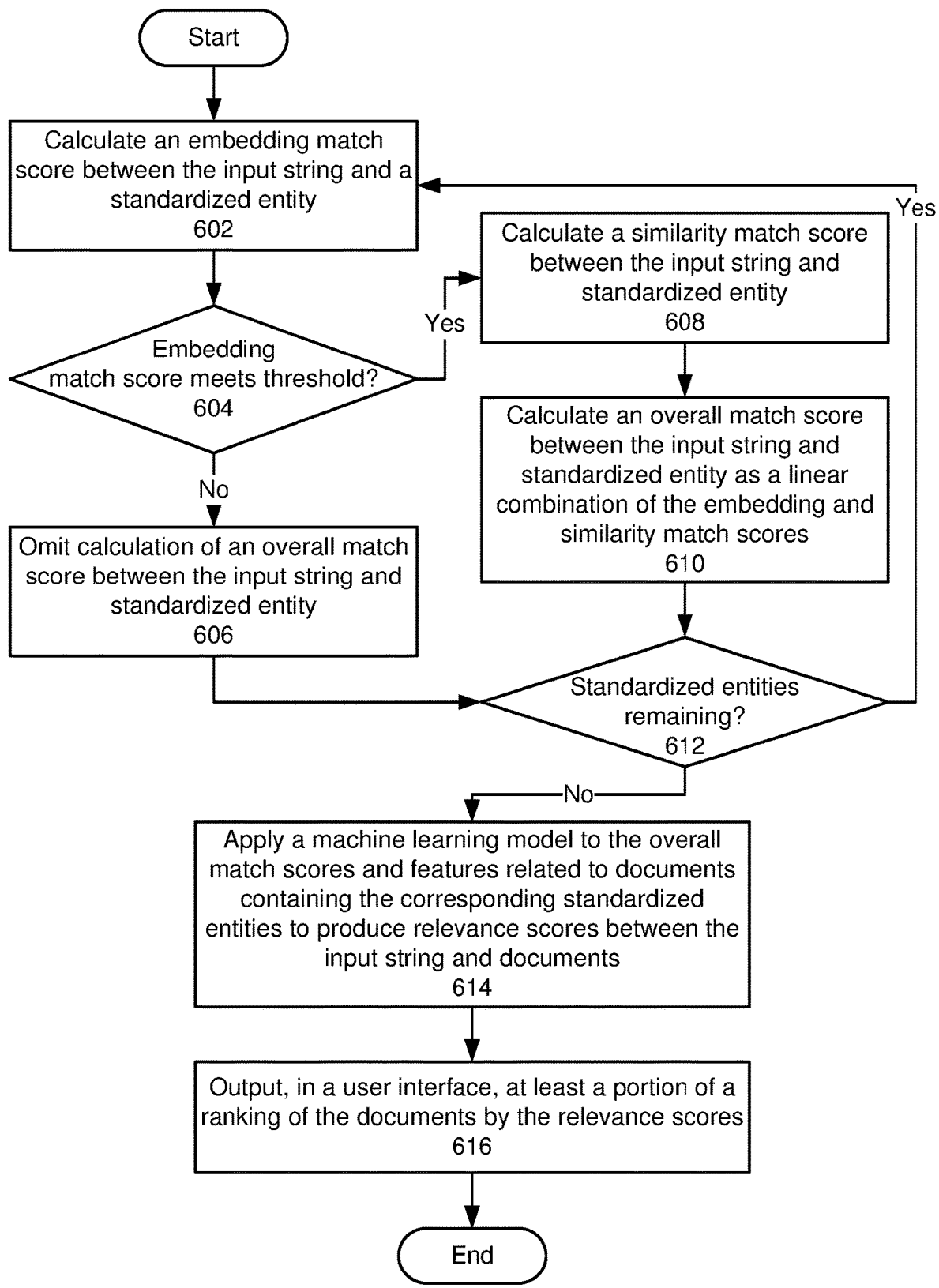
FIG. 6 shows a flowchart illustrating a process of generating output in a user interface of an online system in response to an input string in accordance with the disclosed embodiments.

FIG. 6 shows a flowchart illustrating a process of generating output in a user interface of an online system in response to an input string in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, an embedding match score is calculated between the input string and a standardized entity (operation 602). For example, the standardized entity is identified to be within a threshold distance of the input string in a semantic embedding space, as discussed above. The standardized entity is also, or instead, retrieved from one or more entries of an inverted index that match one or more tokens in the input string. The embedding match score is then calculated as a cosine similarity, Euclidean distance, and/or another measure of vector similarity or distance between embeddings of the input string and standardized entity in the semantic embedding space.

Processing related the standardized entity is performed based on a comparison of the embedding match score with a threshold (operation 604). For example, the threshold includes a numeric or quantile threshold that represents a minimum semantic similarity between the standardized entity and input string. If the threshold is not met by the embedding match score, calculation of an overall match score between the input string and standardized entity is omitted (operation 606). In turn, the standardized entity and documents containing the standardized entity may be excluded from search results, recommendations, and/or other output that is generated in response to the input string.

If the embedding match score meets the threshold, a similarity match score is calculated between the input string and standardized entity (operation 608), and an overall match score between the input string and standardized entity is calculated as a linear combination of the embedding and similarity match scores (operation 610). For example, the similarity match score includes an edit distance and/or another measure of string-based similarity between the input string and standardized entity. The overall match score is then calculated using the following formula:

$$s_{overall} = w_{embedding} * s_{embedding} + w_{similarity} * s_{similarity}$$

In the above formula, $s_{overall}$ represents the overall match score, $s_{embedding}$ represents the embedding match score, and $s_{similarity}$ represents the similarity match score. The overall match score is calculated by adding the embedding match score scaled by a weight $w_{embedding}$ to the similarity match score scaled by a different weight $w_{similarity}$. Values of $w_{similarity}$ and $w_{embedding}$ are manually selected and/or tuned using a machine learning or regression technique. As a result, the overall match score may be a value between 0 and 1 that represents the amount of overall similarity (e.g., as a combination of string-based similarity and semantic similarity) between the input string and standardized entity, the likelihood of a positive outcome between the input string and standardized entity (e.g., a user clicking on a search result, recommendation, and/or other output containing the standardized entity given submission of the input string by the user), and/or another metric to be increased or optimized.

Operations 602-610 are repeated for remaining standardized entities (operation 612) related to the input string. For example, the remaining standardized entities include the union or intersection of a first set of standardized entities that are within a threshold distance to the input string in the embedding space and a second set of standardized entities that contain one or more tokens in the input string. An embedding match score is calculated between each of these standardized entities and the input string (operation 602) and used to filter a second subset of standardized entities that do not have at least a threshold semantic similarity to the input string (operations 604-606). Similarity match scores and overall match scores are additionally calculated between the input string and a second subset of standardized entities that meet the threshold for semantic similarity to the input string (operations 608-610).

A machine learning model is then applied to the overall match scores and features related to documents containing the corresponding standardized entities to produce relevance sores between the input string and documents (operation 614). For example, each relevance score represents the likelihood of a positive outcome between the user providing the input string and a corresponding document (e.g., the user clicking on the document, the user liking the document, the user saving the document, the user applying to a job represented by the document, etc.). As a result, each set of features inputted into the machine learning model represents preferences and/or behavior of the user, attributes of a document, and/or overall match scores between one or more standardized entities in the document and the input string provided by the user.

Finally, at least a portion of the ranking of the documents by the relevance scores is outputted (operation 616). For example, a certain number of positions from the ranking (e.g., top 5, top 25, top 100, etc.) are outputted in one or more pages of search results, recommendations, and/or other types of content in response to the input string.

Figure 7:
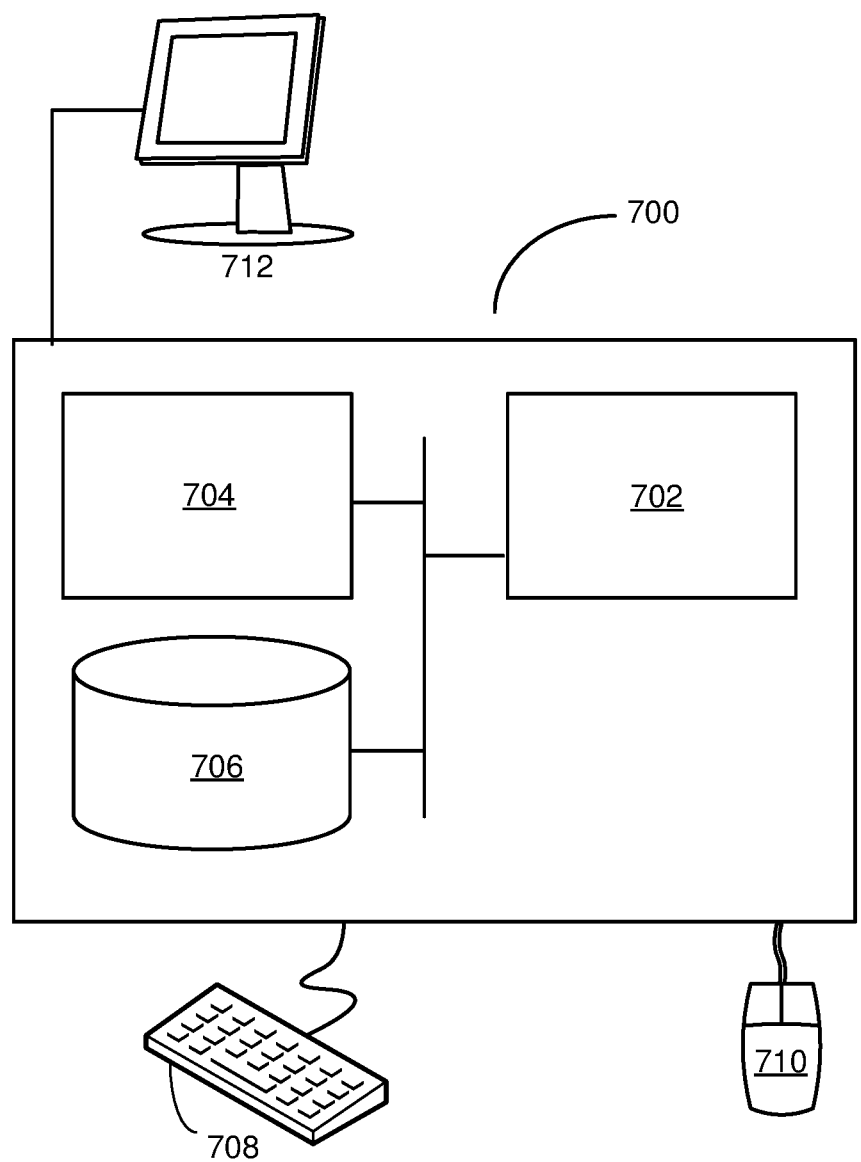
FIG. 7 shows a computer system in accordance with the disclosed embodiments.

FIG. 7 shows a computer system 700 in accordance with the disclosed embodiments. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for processing an input string. The system includes an analysis apparatus, a management apparatus, and a model-creation apparatus, one or more of which may alternatively be termed or implemented as a module, mechanism, or other type of system component. The model-creation apparatus generates labels reflecting outcomes between a set of input strings provided by users of the online system and a set of documents containing the set of standardized entities. The model-creation apparatus also inputs the set of input strings, the set of standardized entities, and the labels as training data for the embedding model.

The analysis apparatus obtains a first embedding produced by the embedding model from an input string representing an entity and a hierarchy of clusters of embeddings generated by the embedding model from a set of standardized entities. Next, the analysis apparatus searches the hierarchy of clusters for a subset of embeddings that are within a threshold proximity to the first embedding in a vector space. The analysis apparatus then calculates embedding match scores between the input string and a first subset of the standardized entities represented by the subset of the embeddings based on distances between the subset of the embeddings and the first embedding in the vector space. Finally, the management apparatus modifies, based on the embedding match scores, content outputted in response to the input string within a user interface of an online system.

In addition, one or more components of computer system 700 may be remotely located and connected to the other components over a network. Portions of the present embodiments (e.g., analysis apparatus, management apparatus, model-creation apparatus, data repository, embedding repository, online network, etc.) may also be located on different nodes of a distributed system that implements the embodiments. For example, the present embodiments may be implemented using a cloud computing system that generates output for a set of remote users based on matches between input strings from the users and standardized entities in a remote online system.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining:
a first embedding produced by an embedding model from an input string representing an entity; and
a hierarchy of clusters of embeddings generated by the embedding model from a set of standardized entities;
searching the hierarchy of clusters for a subset of the embeddings that are within a threshold proximity to the first embedding in a vector space, wherein the searching of the hierarchy of clusters comprises:
identifying, at a root level of the hierarchy, a first subset of the clusters with centers that are closest to the first embedding;
ordering the first subset of the clusters in a priority queue by distances between the centers of the first subset of the clusters and the first embedding in the vector space;
iteratively expanding a first cluster of the first subset at a front of the priority queue into a set of child clusters of the first cluster in the root level of the hierarchy; and
inserting the set of child clusters into the priority queue according to the distances to the first embedding until a second cluster in a lowest level of the hierarchy is identified to have a center with a shorter distance to the first embedding than other clusters in the priority queue;
calculating embedding match scores between the input string and a first subset of the standardized entities represented by the subset of the embeddings based on distances between the subset of the embeddings and the first embedding in the vector space, wherein the distances represent semantic similarity; and
modifying, based on the embedding match scores, content outputted in response to the input string within a user interface of an online system, wherein the modified content outputted comprises standardized entities that are semantically related to the entity.

2. The method of claim 1, further comprising:
retrieving, from an inverted index, a second subset of the standardized entities that contain one or more portions of the input string;
calculating similarity match scores between the input string and the second subset of the standardized entities based on string-based similarities between the input string and the second subset of the standardized entities; and
modifying, based on the similarity match scores, the content outputted in the user interface of the online system.

3. The method of claim 2, wherein the modifying of the content outputted in the user interface of the online system comprises:
combining the embedding match scores and the similarity match scores into overall match scores between the input string and a third subset of the standardized entities, wherein each standardized entity in the third subset of the standardized entities is obtained from the first or second subsets of the standardized entities;
applying a machine learning model to the overall match scores and features related to a set of documents containing one or more standardized entities in the third subset of the standardized entities to produce a set of relevance scores between the input string and the set of documents; and
outputting, in the user interface, at least a portion of a ranking of the set of documents by the set of relevance scores.

4. The method of claim 3, wherein the combining of the embedding match scores and the similarity match scores into the overall match scores comprises:
generating the overall match scores as linear combinations of the embedding match scores and the similarity match scores.

5. The method of claim 3, wherein the combining of the embedding match scores and the similarity match scores into the overall match scores comprises:
when an embedding match score between the input string and a standardized entity falls below a threshold, excluding calculation of an overall match score between the input string and the standardized entity.

6. The method of claim 2, wherein:
the embedding match scores comprise a cosine similarity; and
the similarity match scores comprise an edit distance.

7. The method of claim 1, further comprising:
generating the hierarchy of clusters from the embeddings by:
producing a first set of the clusters at a first level of the hierarchy; and
merging subsets of clusters in the first set of clusters into a second set of the clusters at a second level of the hierarchy that is higher than the first level.

8. The method of claim 7, wherein the generating of the hierarchy of clusters from the embeddings further comprises:
creating the hierarchy of clusters to comprise at least one of a first number of clusters at a root level of the hierarchy and or a second number of levels in the hierarchy.

9. The method of claim 1, wherein each level of the hierarchy contains a disjoint subset of the clusters.

10. The method of claim 1, further comprising:
generating labels reflecting outcomes between a set of input strings provided by users of the online system and a set of documents containing the set of standardized entities; and
inputting the set of input strings, the set of standardized entities, and the labels as training data for the embedding model.

11. The method of claim 1, wherein the entity comprises at least one of:
a title;
a company;
an industry; or
a skill.

12. A system, comprising:
one or more processors; and memory storing instructions that, when executed by the one or more processors, cause the system to:
obtain:
a first embedding produced by an embedding model from an input string representing an entity; and
a hierarchy of clusters of embeddings generated by the embedding model from a set of standardized entities;
search the hierarchy of clusters for a subset of the embeddings that are within a threshold proximity to the first embedding in a vector space, wherein the searching of the hierarchy of clusters comprises:
identifying, at a root level of the hierarchy, a first subset of the clusters with centers that are closest to the first embedding;
ordering the first subset of the clusters in a priority queue by distances between the centers of the first subset of the clusters and the first embedding in the vector space;
iteratively expanding a first cluster of the first subset at a front of the priority queue into a set of child clusters of the first cluster in the root level of the hierarchy; and
inserting the set of child clusters into the priority queue according to the distances to the first embedding until a second cluster in a lowest level of the hierarchy is identified to have a center with a shorter distance to the first embedding than other clusters in the priority queue;
calculate embedding match scores between the input string and a first subset of the standardized entities represented by the subset of the embeddings based on distances between the subset of the embeddings and the first embedding in the vector space, wherein the distances represent semantic similarity; and
modify, based on the embedding match scores, content outputted in response to the input string within a user interface of an online system, wherein the modified content outputted comprises standardized entities that are semantically related to the entity.

13. The system of claim 12, wherein the memory further stores instructions that, when executed by the one or more processors, cause the system to:
retrieve, from an inverted index, a second subset of the standardized entities that contain one or more portions of the input string;
calculate similarity match scores between the input string and the second subset of the standardized entities based on string-based similarities between the input string and the second subset of the standardized entities; and
modify, based on overall match scores calculated by combining the similarity match scores and the embedding match scores, the content outputted in the user interface of the online system.

14. The system of claim 13, wherein the modifying of the content outputted in the user interface of the online system comprises:
calculating the overall match scores for a third subset of the standardized entities as linear combinations of the embedding match scores and the similarity match scores, wherein each standardized entity in the third subset of the standardized entities is obtained from the first or second subsets of the standardized entities;
applying a machine learning model to the overall match scores and features related to a set of documents containing one or more standardized entities in the third subset of the standardized entities to produce a set of relevance scores between the input string and the set of documents; and
outputting, in the user interface, at least a portion of a ranking of the set of documents by the set of relevance scores.

15. The system of claim 12, wherein the memory further stores instructions that, when executed by the one or more processors, cause the system to:
generate the hierarchy of clusters from the embeddings by:
producing a first set of the clusters at a first level of the hierarchy; and
merging subsets of clusters in the first set of clusters into a second set of the clusters at a second level of the hierarchy that is higher than the first level.

16. The system of claim 15, wherein the generating of the hierarchy of clusters further comprises:
creating a disjoint subset of the clusters at each level of the hierarchy.

17. The system of claim 12, wherein the memory further stores instructions that, when executed by the one or more processors, cause the system to:
generate labels reflecting outcomes between a set of input strings provided by users of the online system and a set of documents containing the set of standardized entities; and
input the labels and input string-entity pairs generated from the set of input strings and the set of standardized entities as training data for the embedding model.

18. The system of claim 12, wherein the modifying of the content outputted in the user interface of the online system comprises:
applying a machine learning model to the embedding match scores and features related to a set of documents containing one or more standardized entities in the first subset of the standardized entities to produce a set of relevance scores between the input string and the set of documents; and
outputting, in the user interface, at least a portion of a ranking of the set of documents by the set of relevance scores.

19. The system of claim 18, wherein the modifying of the content outputted in the user interface of the online system further comprises:
when an embedding match score between the input string and a standardized entity falls below a threshold, removing one or more documents containing the standardized entity from the set of documents prior to producing the set of relevance scores.

20. A non-transitory computer-readable storage medium storing instructions that when executed by a computer cause the computer to perform a method, the method comprising: obtaining:
a first embedding produced by an embedding model from an input string representing an entity; and
a hierarchy of clusters of embeddings generated by the embedding model from a set of standardized entities;
searching the hierarchy of clusters for a subset of the embeddings that are within a threshold proximity to the first embedding in a vector space, wherein the searching of the hierarchy of clusters comprises:
identifying, at a root level of the hierarchy, a first subset of the clusters with centers that are closest to the first embedding;
ordering the first subset of the clusters in a priority queue by distances between the centers of the first subset of the clusters and the first embedding in the vector space;
iteratively expanding a first cluster of the first subset at a front of the priority queue into a set of child clusters of the root cluster in the first level of the hierarchy; and
inserting the set of child clusters into the priority queue according to the distances to the first embedding until a second cluster in a lowest level of the hierarchy is identified to have a center with a shorter distance to the first embedding than other clusters in the priority queue;
calculating embedding match scores between the input string and a first subset of the standardized entities represented by the subset of the embeddings based on distances between the subset of the embeddings and the first embedding in the vector space, wherein the distances represent semantic similarity; and
modifying, based on the embedding match scores, content outputted in response to the input string within a user interface of an online system, wherein the modified content outputted comprises standardized entities that are semantically related to the entity.

* * * * *